No. 612,542. Patented Oct. 18, 1898.
F. O. BULLIS.
BICYCLE DRIVING MECHANISM.
(Application filed Sept. 29, 1897.)
(No Model.)

WITNESSES:
R. B. Shelley
Geo. L. Miner

INVENTOR.
F. O. Bullis

THE NORRIS PETERS CO., PHOTO-LITHO., WASHINGTON, D. C.

UNITED STATES PATENT OFFICE.

FREDRICK O. BULLIS, OF BRIGHTON, NEW YORK.

BICYCLE-DRIVING MECHANISM.

SPECIFICATION forming part of Letters Patent No. 612,542, dated October 18, 1898.

Application filed September 29, 1897. Serial No. 653,468. (No model.)

*To all whom it may concern:*

Be it known that I, FREDRICK O. BULLIS, a resident of Brighton, in the county of Monroe and State of New York, have invented certain new and useful Improvements in Bicycle-Driving Mechanism; and I do hereby declare the following to be a full, clear, and exact description of the invention, such as will enable others skilled in the art to which it pertains to make and use the same.

The invention relates to mechanism for propelling bicycles, and has for its object to improve such mechanism and promote the ease and efficiency of the pedaling; and the invention consists in the construction hereinafter described and particularly pointed out.

Figure 1:
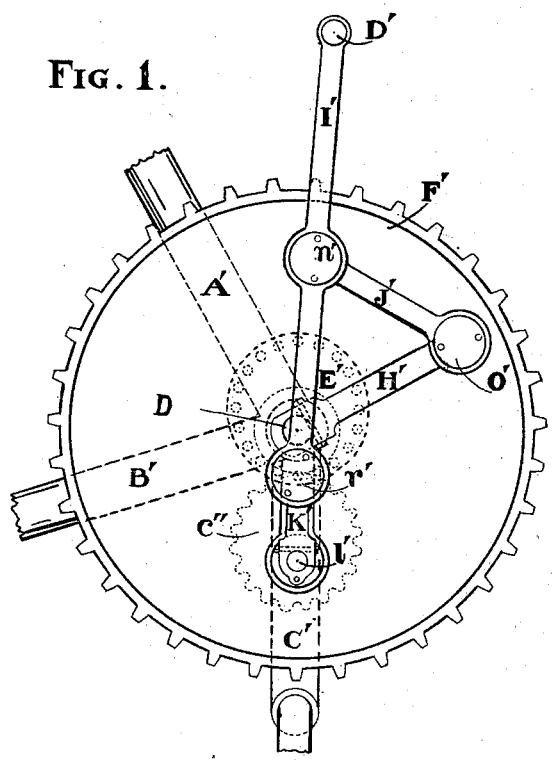
Figure 2:
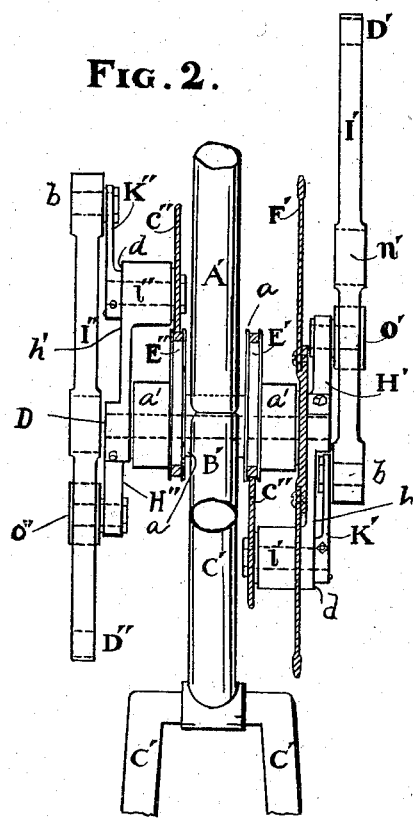
Figure 3:
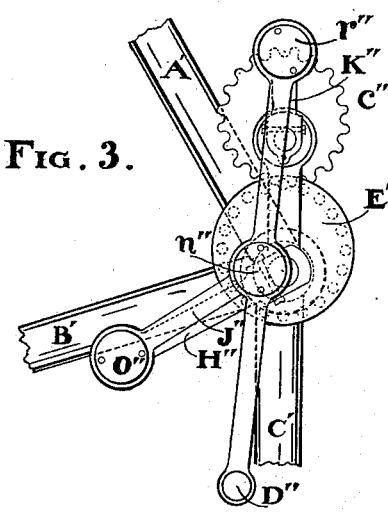
Figure 4:
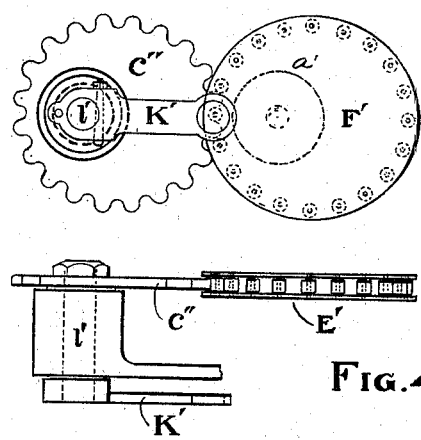

In the accompanying drawings, Figure 1 is a side elevation. Fig. 2 is a plan, partly in section. Fig. 3 is a side elevation showing a different arrangement of parts, the sprocket-wheel being omitted. Fig. 4 includes an elevation and a plan of eccentric gears and a part of their intermediate connections.

In the drawings the reference-letters A', B', and C' indicate a bicycle-frame of usual construction, having a tubular part $a$ provided with an enlargement $a'$ to receive ball-bearings for the main or crank shaft.

D denotes the crank-shaft, and D' D'' the bearings for the pedal-shafts.

F' is the sprocket-wheel, and H' and H'' indicate the main cranks.

I' and I'' denote levers to carry the pedals. These pedal-levers near their forward ends are respectively connected to the cranks H' and H'' by the links J' and J''.

K' K'' are cranks rigidly fixed to shafts $l'$ and $l''$, respectively, and by them fixed to gears $c''$, also fixed each at one of its foci to said shafts. These gears $c''$ travel about the gears E' and E'', fixed at one of its foci to the frame, through the medium of the hub or tubular bracket $a$, to which the parts A', B', and C' are fixed and within which the shaft D rotates. These cranks K' K'' connect the said traveling gears pivotally at $d$ with the extension $h$ and $h'$ of the main cranks and at $b$ with the pedal-levers I' and I''. The said pedal-levers at $n'$ and $n''$ about their mid-length are connected with links J' and J'', which also are pivoted to the main cranks H' and H'' at $o'$ and $o''$, respectively.

The construction is such that the pedal-levers can be advanced and retracted with respect to the main cranks to virtually and materially lengthen said cranks in their forward and downward movement. The pedal-levers constitute extensions of the cranks H' and H''; but said levers are retracted at the time of the ascent of a crank and effects that the idle foot of the rider moves quickly and through a comparatively short path until it reaches or approaches an effective position, whereupon the pedal-lever advances to lengthen or extend the crank, as stated, and thereby provide an increased leverage.

The pedal-levers are advanced and retracted by means of the elliptical gears E' and E'', fixed on the hub or tubular bracket $a$ of the frame, coöperating with the elliptical gears $c''$, which are revolved about gears E' E'' by the extension $h$ $h'$ of the main cranks.

The gears $c''$ are also elliptical in form and have each at one of its foci a fixed connection with a shaft $l'$ or $l''$, which is pivoted in one of the main-crank extensions $h$ or $h'$ and fixed to a pedal-lever-connecting crank K' or K''.

When the main axes of the elliptical gears are in or near the same straight line on both sides of the bicycle, the leverage of one of the main cranks extended by the pedal-levers is at its maximum or its minimum. The situation corresponding to the maximum leverage is illustrated in Fig. 1 and at the right of Fig. 2 and also in Fig. 4, the opposite crank, with its extension, being simultaneously in a situation corresponding to the least leverage, as shown at the left of Fig. 2 and in Fig. 3.

It will be perceived that the elliptical gears provide that the idle foot shall ascend quickly from bottom to top toward the working position of the foot, in which situation the traveling gear passes down the front of the fixed gear. The speed of the foot and of the traveling gear as it descends is decreased and the main crank is virtually lengthened. These effects are insured by the particular gears, combined as set forth. The leverage of the descending crank is still further increased by its connection with the pedal-lever at its middle, which connection also aids and insures the quick ascent of the idle crank as it moves from bottom point, where it ceases to be practically effective toward a point near the top, where it is again brought in an effective working position.

Having described my invention, what I claim is—

1. In a bicycle, the combination of the shaft, the main cranks having extensions on the opposite side of the shaft from the cranks proper, the pedal-levers, the connecting-links J' J'', the connecting-cranks K' K'', the elliptical gears E' E'' fixed to the frame and the elliptical traveling gears c'' connected to the crank extensions and to the pedal-levers by shafts l' l'', substantially as described.

2. In a bicycle, the combination of the shaft, the main cranks having extensions on the opposite side of the shaft from the cranks proper, the pedal-levers, the connecting-links J' J'', the connecting-cranks K' K'', the elliptical gears E' E'' fixed to the frame and the elliptical traveling gears c'' connected to the crank extensions and to the pedal-levers by shafts l' l'', said links being connected to the middle point of the pedal-levers, substantially as described.

In testimony whereof I have signed this specification in the presence of two subscribing witnesses.

FREDRICK O. BULLIS.

Witnesses:
   FRED. T. MILLHAM,
   LORING H. BANNISTER.